April 14, 1959     G. A. KELLEY     2,881,853

CONDITIONING METHOD AND APPARATUS

Filed Dec. 7, 1956

INVENTOR.
GILBERT A. KELLEY
BY

2,881,853
CONDITIONING METHOD AND APPARATUS

Gilbert A. Kelley, Toledo, Ohio, assignor to Surface Combustion Corporation, Toledo, Ohio, a corporation of Ohio Application December 7, 1956, Serial No. 626,943

10 Claims. (Cl. 183—2)

This invention relates to novel apparatus for cooling and dehumidifying air and more particularly to a two-stage system for accomplishing the same.

A two-stage conditioning system consists of two or more cooling coils with dehumidifying apparatus coupled with one or more of the coils. The first coil is cooled with water which is usually recirculated through a cooling tower except in locations where the water is relatively inexpensive in which case it may be dispensed with after passing through the coil. The final stage or stages of cooling are accomplished with refrigeration. By cooling the air in the initial stages with water, the cost of cooling is maintained at a minimum. Where little cooling is required, it may be entirely done with water. Water cannot be used generally to cool below 60–70° F., however, and it must be supplemented with refrigeration in the majority of applications.

The desired dew point or relative humidity of the conditioned air usually requires that dehumidifying be done in conjunction with both cooling steps. This has the advantage that considerable moisture is removed before the air reaches the refrigeration coil. The moisture removed is, therefore, not cooled with the air in the second stage which reduces the heat removing capacity required for the refrigerating coil.

The hygroscopic liquid used in the dehumidification steps is most effective when sprayed on the coils. Where the two coils are contained within one unit, the hygroscopic liquid is drained from the coils into a single sump. The sump contains regenerated hygroscopic liquid which is initially much hotter than the other liquids drained from the coils. This is true since the hygroscopic liquid is regenerated at 220–250° F., and is returned to the sump at this temperature. The resulting mixture of the hot regenerated liquid, the cool liquid that has passed over the water-cooled coil, and the cold liquid has passed over the refrigeration coil, has a temperature approximately equal to the temperature of that liquid passed over the water-cooled coil. In any case, the temperature of the mixture is substantially above that passed over the refrigeration coil. A considerable portion of the heat removal capacity of the refrigeration coil is thus spent in continually cooling the warm liquid passed thereover.

To overcome this disadvantage, the coils may be placed in separate housings through which the air passes in series. Each housing has a separate sump for the hygroscopic liquid received from the respective coil. This apparatus may thus maintain the liquid in the refrigeration coil sump cooler than that in the water coil sump. The apparatus, however, being in two separate housings, require considerably more space. This is a prime disadvantage where space is at a premium, which includes any crowded quarters, ships, or vehicles. In addition, it is difficult to maintain proper concentration control of the liquid in the two sumps for this type of application and, at best, a comparatively complicated control system is required.

To overcome these disadvantages, a new apparatus has been developed which is both efficient and inexpensive. The new apparatus costs from 20% to 25% less than the previous mentioned apparatus and requires 35% less floor space.

For further consideration of what is novel and the invention, refer to the following portion of the specification, the depending claims, and the accompanying drawing.

Figure 1:
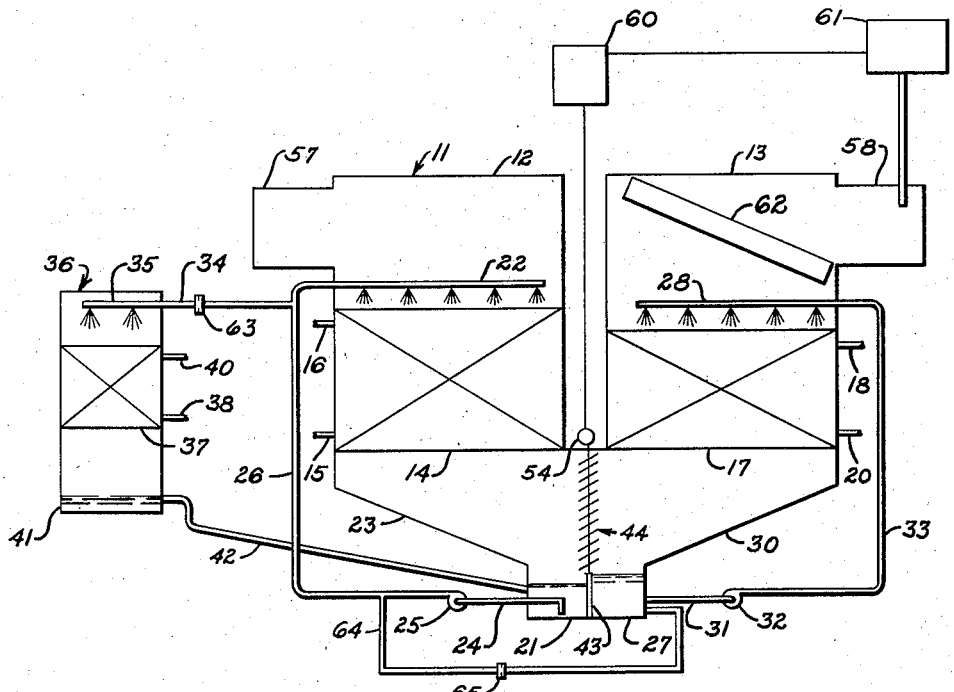
Figure 1 is a schematic representation of apparatus embodying the invention.

According to the invention, the conditioning apparatus 11 comprises a first casing 12 and a second casing 13. The first casing contains a water-cooled coil 14 to which water is supplied through inlet 15 and removed through outlet 16. The inlet and outlet may be connected to a cooling tower (not shown). Similarly, casing 13 contains a refrigerant-cooled coil 17 to which refrigerant is supplied through inlet 18 from a compresser (not shown) and removed from outlet 20.

A first sump 21 is provided to collect hygroscopic liquid which is sprayed by spray bar 22 over coil 14 and drains from sloping surface 23 into the sump. A pipe 24 connects the sump to a pump 25 which supplies the liquid through pipe 26 to spray bar 22. In a like manner, a sump 27 collects hygroscopic liquid which is sprayed by spray bar 28 over coil 17 and drains from sloping surface 30 into the sump. A pipe 31 connects sump 27 to a pump 32 which supplies the liquid through pipe 33 to spray bar 28.

A branch pipe 34 leads from pipe 26 to a spray bar 35 of regenerator 36. The regenerator has a coil 37 over which the hygroscopic liquid is sprayed, the coil being supplied steam through inlet 40 and removed through outlet 38. Outside or scavenger air is passed through the regenerator by a blower (not shown) to carry away the water vapor removed from the hygroscopic liquid by the heat from the steam. The regenerated liquid then is collected by sump 41 and drained back to sump 21 through drain pipe 42. The steam may be supplied coil 37 at a constant rate or it may be controlled in a conventional manner by an adjustable valve 68 at the inlet which is controlled according to the specific gravity of the liquid in sump 21 as measured by instrument 70 (Figure 3), or, in most cases, it may be controlled according to the liquid level in sump 21. When the specific gravity is below that desired, valve 68 will be further opened to supply more steam to coil 37 and further concentrate the solution. When the specific gravity is above that desired the opposite will occur.

Figure 2:
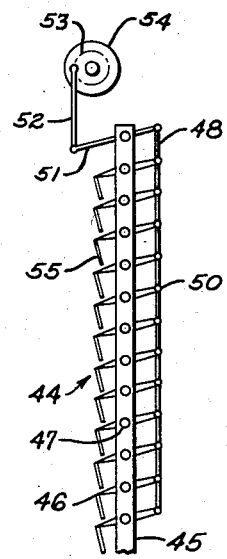
Figure 2 is a detailed view of a portion of the apparatus of Figure 1.

Sumps 21 and 27 are separated by a weir 43 above which is a vane assembly 44, preferable adjustable, that is located in the path of air which flows through inlet duct 57, down through coil 14, up through coil 17, and out outlet duct 58. Although many types of vane assemblies may be used here, the one of Figure 2 is typical. A frame 45 holds vanes 46 by means of rods 47 which rotatably hold the vanes. A rod or strip 48 extends down one side of vanes 46 and is pivotably attached thereto by means of pins or rivets 50. A linkage 51, pivoted at frame 45, is linked at one end to rod 48 and at its other end to a second linkage 52. This linkage is actuated by a cam 53 driven by motor 54. As the cam 53 is rotated, rod 48 is moved vertically and the angle of vanes 46 is correspondingly changed. The linkages and cam can be adjustable to move the vanes between a maximum and a minimum angle as desired. When assembly 44 is manually adjusted, the vanes are preferably equipped with projections 55 which limit the minimum position to which the vanes may be closed.

Figure 3:
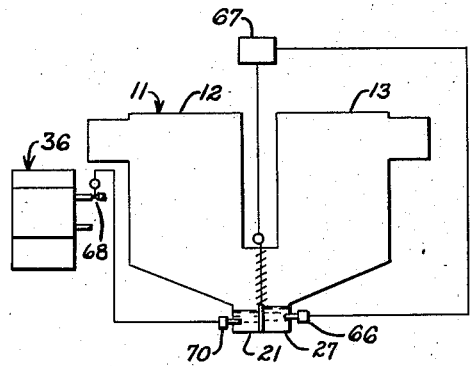
Figure 3 is a schematic representation illustrating other controls used with the apparatus of Figure 1.

Motor 54 may be automatically controlled by means of a commercially available proportioning controller 67 which controls motor 54 according to the concentration of the hygroscopic liquid in sump 27 as measured by a specific gravity instrument 66 (Figure 3). Similarly, motor 54 may be controlled by proportioning controller 60 which controls the motor according to the dew point of the exiting air through outlet duct 58 as measured by a dew point instrument 61 (Figure 1).

In some installations, it may be preferred to pump a constant amount of liquid from sump 21 to sump 27 and limit the amount of carryover by means of the vane assembly 44. In this case, a pipe 64 connects pipe 26 downstream of pump 25 to sump 27. An orifice 65 is employed in pipe 64 to obtain a constant, measured flow. Vane assembly 44 then helps attain the desired results by limiting the amount of carryover which supplements the constant flow.

In the operation of the apparatus, air is drawn through duct 57 from the room which is being conditioned. A blower (not shown) is placed in outlet duct 58 for this purpose. The air is cooled by coil 14 and dehumidified by the hygroscopic liquid sprayed over the coil. This liquid, being relatively warm, tends to heat the air and counteract the cooling effect. A portion of the hygroscopic liquid is entrained by the air carried therewith. As the air passes through the vanes, its direction is sharply changed. This causes a portion of the hygroscopic liquid to be thrown out of the air and deposited on the vanes. The amount released from the air depends on how sharply the direction of the air flow is changed. The liquid deposited on the vanes then drains back into sump 21. The remaining liquid passes through the vanes with the air and is eventually removed by means of an eliminator 62. The removed liquid falls into sump 27, the air passing out through duct 58 to the conditioned room.

In a typical application, air enters the unit at 95° dry bulb and 80° F. wet bulb. After passing through coil 14 and being contacted with the hygroscopic liquid, the air will be at approximately the same dry bulb temperature and at a wet bulb temperature of 65° F. In this case, water for coil 14 enters at 85° F. whose cooling tendency is counterbalanced by the heated hygroscopic liquid which is at a temperature of 110° F. This is so because the regenerated liquid enters sump 21 from regenerator 36 at approximately 220° F. which, although small in volume, is sufficient to maintain the mixture in the sump at 110° F. The air then passes through assembly 44 and over coil 17. This refrigerated coil and the additional hygroscopic liquid produce a temperature in the air at outlet duct 58 of approximately 40° F. dry bulb with a dew point of 20° F. The hygroscopic liquid in this case will be maintained at approximately the temperature of coil 17 or 40° F. since no heated, regenerated liquid is added to the sump.

To obtain optimum dehumidification, it is necessary that the hygroscopic liquid be maintained at the maximum concentration possible without salting out. When the hygroscopic liquid used is an aqueous solution of lithium chloride, a concentration of this salt of 44% by weight is optimum in sump 21 and a concentration of 40% is optimum in sump 27. Concentrations below these percentages will not produce the maximum possible dehumidification while concentrations above these percentages will likely cause the solution to salt out. Obviously, if a single combined sump were used, the concentration would have to be maintained at the lower amount, 40%, to prevent the liquid which contacts coil 17 from salting out. Maximum dehumidification would not be obtained then by the solution sprayed over coil 14.

The concentration of 44% in sump 21 is obtained by adjusting the degree of regeneration in the regenerator by regulating the steam supplied coil 37. The concentration of 40% in sump 27 is obtained by regulating the amount of solution carried over in the air which is in turn regulated by the angle of the vanes 46 as previously mentioned. The greater the amount of carryover, the more concentrated will be the solution in sump 27.

Where the angle of the vanes is manually adjusted, it is not feasible to control the concentration in sump 27 at maximum concentration under all load conditions. The vanes will normally be put into one position and not thereafter varied. To obtain optimum dehumidification under manual operation the angle of the vanes is set so that the concentration of the liquid in sump 27 will be at the maximum allowable without salting out under minimum load conditions. As the load increases, i.e., when the amount of water in the air to be conditioned increases, the concentration of the liquid in sump 27 tends to become more dilute so that salting out cannot occur under any conditions. The dilution occurs because the amount of carryover remains the same and the amount of moisture picked up increases under the increased load. With a given maximum load condition there will be a corresponding minimum concentration of the liquid in sump 27.

When automatic operation is employed, motor 54 will be energized to increase the angle of the vanes with respect to the direction of air flow so as to produce more deflection of the air stream when the concentration of the liquid in sump 27 is above that desired, or the dew point of the conditioned air is below that desired. With more deflection, there will be less carryover of the more concentrated liquid. Similarly motor 54 will be energized to decrease the angle of the vanes with respect to the direction of air flow so as to produce less deflection of the air stream when the concentration of the liquid in sump 27 is below that desired, or the dew point of the conditioned air is above that desired. With less deflection there will be more carryover of the more concentrated liquid. The liquid in sump 27 is continually being diluted by the moisture removed from the air passing over coil 17 but is counteracted by the more concentrated liquid which is carried over. When the carryover is decreased, the liquid then becomes more dilute. The concentration of the liquid then is lowered and the dew point will be raised since less moisture will be removed from the air by the more dilute liquid. With the opposite conditions occurring, the angle of the vanes with the direction of flow of the air will be decreased to obtain the opposite results. When the motor is controlled according to the concentration of the liquid, the maximum concentration is attained for all load conditions instead of just the minimum as occurs with manual adjustment of the vanes.

Motor 54 can also be employed to regulate a valve or resistance in line 64 so that this flow will be controlled. In such a case, the angle of vanes 44 will be fixed at a maximum to limit the amount of carryover to the minimum desired with the flow through pipe 65 supplementing this.

Changing the angle of the vanes has little effect on the resistance to the air flow. This holds true because the air resistance, even with the vanes at a maximum angle, is small compared to the resistance presented by coils 14 and 17. Under the above stated conditions, when the air in the unit is under a pressure of 4" w.g., this will be changed by less than .1" w.g. when the angle of the vanes is changed from its minimum to its maximum.

The invention thus basically comprises a two-stage cooling and dehumidifying system with two sumps separated by a weir and which has means for transferring the liquid from the first to the second stage.

The above has been intended to serve in an illustrative and not a limiting sense, the scope of the invention being determined only by the depending claims.

I claim:

1. Apparatus for conditioning air comprising: a first cooling coil; a first sump containing a hygroscopic liquid; means for circulating hygroscopic liquid from said first sump over said first cooling coil and back to said first sump; a second cooling coil; a second sump containing a hygroscopic liquid, said second sump being adjacent to said first sump and separated therefrom by a weir; means for circulating hygroscopic liquid from said second sump over said second cooling coil and back to said second sump; means for establishing a flow of air in contact with said first cooling coil and the hydroscopic liquid flowing thereover, and then in contact with said second cooling coil, whereby a portion of hygroscopic solution flowing over the first cooling coil is entrained by the air; and means situated in the path of the air, downstream from said water cooled coil superjacent said weir for changing the direction of flow of air whereby a controlled portion of the entrained hygroscopic liquid is separated from the air and returned to said first sump.

2. Apparatus according to claim 1 wherein said last-named means comprises a plurality of substantially parallel vanes disposed at an angle to the general direction of the path of the air.

3. Apparatus according to claim 2 wherein the angle of said vanes is adjustable.

4. Apparatus according to claim 3 characterized by control means for controlling the angle of said vanes to maintain substantially constant the humidity of conditioned air discharged from the apparatus.

5. Apparatus for conditioning air comprising: a first cooling coil; a first sump containing a hygroscopic liquid; means for circulating hygroscopic liquid from said first sump over said first cooling coil and back to said first sump; a second cooling coil; a second sump containing a hygroscopic liquid; means for circulating hygroscopic liquid from said sump over said second cooling coil and back to said second sump; means for establishing a flow of air in contact with said first cooling coil and the hygroscopic solution flowing thereover and then in contact with said second cooling coil, whereby a portion of the hygroscopic liquid flowing over said first cooling coil is entrained by the air; means stituated downstream, relative to the air flow, from said second cooling coil for separating entrained hygroscopic solution from the air, and for delivering the separated solution to the second sump; and means for so controlling the amount of entrained hygroscopic liquid carried by the air before the air flows in contact with said second cooling coil so as to maintain substantially constant the concentration of hygroscopic solution in said second sump.

6. A method for conditioning air which comprises: withdrawing hygroscopic liquid from a first sump; spraying the hygroscopic liquid into a first enclosed zone into contact with a cooled surface; collecting a part of the hygroscopic liquid so sprayed in the first sump; withdrawing hygroscopic liquid from a second sump; spraying the hygroscopic liquid into a second enclosed zone into contact with a cooled surface; collecting in the second sump hygroscopic liquid from within the second enclosed zone; passing air through the first enclosed zone in contact with the hygroscopic liquid being sprayed within the first zone so as to entrain within the air a portion of the hygroscopic liquid; suddenly changing the direction of movement of the air to separate therefrom, and return to the first sump, a part of the hygroscopic solution entrained therein; and then passing the air through the second enclosed zone to deliver to the second enclosed zone, and ultimately to the second sump, entrained hygroscopic solution at a rate sufficient to maintain a predetermined concentration of hygroscopic solution in the second sump.

7. A method for conditioning air which comprises: withdrawing hygroscopic liquid from a first sump; spraying the hygroscopic liquid into a first enclosed zone into contact with a cooled surface; collecting a part of a hygroscopic liquid so sprayed in the first sump; withdrawing hygroscopic liquid from a second sump; spraying the hygroscopic liquid into a second enclosed zone into contact with a cool surface; collecting in the second sump hygroscopic liquid from within the second enclosed zone; passing air through the first enclosed zone in contact with the hygroscopic liquid being sprayed within the first zone so as to entrain within the air a portion of the hygroscopic liquid; suddenly changing the direction of movement of the air to separate therefrom, and return to the first sump a part of the hygroscopic liquid entrained therein; passing the air through the second enclosed zone to deliver to the second enclosed zone, and ultimately to the second sump, entrained hygroscopic solution at a rate sufficient to maintain a predetermined concentration of hygroscopic solution in the second sump; and transferring hygroscopic liquid from the second sump to the first sump at a rate sufficeint to maintain a predetermined level thereof within the second sump.

8. Apparatus for conditioning air comprising: a first conditioning chamber; a cooling coil positioned within said chamber; a first sump containing a hygroscopic liquid; means for circulating hygroscopic liquid from said first sump over said cooling coil, and back to said first sump; a second conditioning chamber; a second sump containing a hygroscopic liquid; means for circulating hygroscopic liquid from said second sump, through said second chamber, and back to said second sump; means for transferring heat from the hygroscopic liquid circulated from said second sump; means for establishing a flow of air through said first chamber in contact with said first coil and the hygroscopic solution flowing thereover, and then through said second chamber in contact with hygroscopic solution therein, whereby a portion of hygroscopic liquid flowing over said first cooling coil is entrained by the air; means situated downstream, relative to the air flow, from said second conditioning chamber for separating entrained hygroscopic solution from the air and for delivering the separated solution to said second sump; and means for so controlling the amount of entrained hygroscopic solution carried by the air moving into said second chamber as to maintain substantially constant the concentration of the hygroscopic solution in said second sump.

9. Apparatus for conditioning air comprising: a first cooling coil; a first sump containing a hygroscopic liquid; means for circulating hygroscopic liquid from said first sump over said first cooling coil and back to said first sump; a second cooling coil; a second sump containing a hygroscopic liquid, said second sump being adjacent to said first sump and separated therefrom by a weir; means for circulating hygroscopic liquid from said second sump over said second cooling coil and back to said second sump; means for establishing a flow of air in contact with said first cooling coil and the hygroscopic liquid flowing thereover, and then in contact with said second cooling coil, whereby a portion of hygroscopic solution flowing over the first cooling coil is entrained by the air; a plurality of substantially parallel adjustable vanes situated in the path of the air, downstream from said first cooling coil superjacent said weir; and means for automatically increasing the angle of the vanes with respect to the direction of air flow to produce more deflection of the air when the concentration of liquid in the second sump is above a predetermined value, and for automatically decreasing the angle of the vanes with respect to the direction of the air flow to produce less deflection of the air when the concentration of the liquid in the second sump is below said predetermined value.

10. Apparatus for conditioning air comprising: a first cooling coil; a first sump containing a hygroscopic liquid; means for circulating hygroscopic liquid from said first sump over said first cooling coil and back to said first sump; a second cooling coil; a second sump containing a hygroscopic liquid, said second sump being adjacent to said first sump and separated therefrom by a weir;

means for circulating hygroscopic liquid from said second sump over said second cooling coil and back to said second sump; means for establishing a flow of air in contact with said first cooling coil and the hygroscopic liquid flowing thereover, and then in contact with said second cooling coil, whereby a portion of hygroscopic solution flowing over the first cooling coil is entrained by the air; a plurality of substantially parallel adjustable vanes situated in the path of the air, downstream from said first cooling coil superjacent said weir; and means for automatically increasing the angle of the vanes with respect to the direction of air flow to produce more deflection of the air when the humidity of conditioned air exhausted from the apparatus is below a predetermined value, and for automatically decreasing the angle of the vanes with respect to the direction of the air flow to produce less deflection of the air when the humidity of conditioned air exhausted from the apparatus is above said predetermined value.

References Cited in the file of this patent

UNITED STATES PATENTS

| | | |
|---|---|---|
| 2,090,466 | Bichowsky | Aug. 17, 1937 |
| 2,279,938 | Crawford | Apr. 14, 1942 |
| 2,280,633 | Crawford | Apr. 21, 1942 |
| 2,290,465 | Crawford | July 21, 1942 |
| 2,420,993 | Kelley | May 20, 1947 |
| 2,693,247 | Olstad et al. | Nov. 2, 1954 |
| 2,700,536 | Kelley et al. | Jan. 25, 1955 |